United States Patent [19]

Kurisu et al.

[11] Patent Number: 5,708,195
[45] Date of Patent: Jan. 13, 1998

[54] PIPELINE BREAKAGE SENSING SYSTEM AND SENSING METHOD

[75] Inventors: Hiromitsu Kurisu, Sagamihara; Teruji Sekozawa, Kawasaki; Shigeyuki Shimauchi, Tokyo; Mikio Yoda, Ibaraki-ken, all of Japan

[73] Assignee: Hitachi, Ltd., Tokyo, Japan

[21] Appl. No.: 675,117

[22] Filed: Jul. 3, 1996

[30] Foreign Application Priority Data

Jul. 6, 1995 [JP] Japan ................... 7-170678

[51] Int. Cl.$^6$ .............. G01M 03/28; G01M 03/00; G01S 05/18; F16K 31/02
[52] U.S. Cl. .............. 73/40.5 R; 73/40; 73/592; 73/40.5 A; 340/605
[58] Field of Search ............... 73/40.5 R, 40, 73/40.5 A, 592; 340/605

[56] References Cited

U.S. PATENT DOCUMENTS

| 3,264,864 | 8/1966 | Reid et al. ................... 73/69 |
| 3,561,256 | 2/1971 | Bustin et al. ................ 73/40.5 |
| 4,608,857 | 9/1986 | Mertens et al. ............. 73/40.5 R |
| 4,609,994 | 9/1986 | Bassim et al. ................. 364/551 |
| 4,651,559 | 3/1987 | Horigome et al. .......... 73/40.5 R |
| 4,727,748 | 3/1988 | Horigome et al. ................. 73/40 |
| 4,735,231 | 4/1988 | Jacquet ....................... 137/459 |
| 4,796,466 | 1/1989 | Farmer .................... 73/40.5 R |
| 4,872,007 | 10/1989 | Monterosso et al. ....... 340/870.01 |
| 5,005,006 | 4/1991 | Ratcliff ........................ 340/611 |
| 5,117,676 | 6/1992 | Chang ....................... 73/40.5 A |
| 5,136,876 | 8/1992 | Taylor ....................... 73/40.5 A |
| 5,416,724 | 5/1995 | Savic .......................... 364/509 |
| 5,428,989 | 7/1995 | Jerde et al. ................ 73/40.5 R |
| 5,539,384 | 7/1996 | Frazier ......................... 340/605 |
| 5,544,074 | 8/1996 | Suzuki et al. ................. 364/508 |

FOREIGN PATENT DOCUMENTS

| 62-161035 | 7/1987 | Japan. |
| 5-26400 | 2/1993 | Japan. |
| 5-79941 | 3/1993 | Japan. |
| 6-129922 | 5/1994 | Japan. |

OTHER PUBLICATIONS

Study on water leak pipeline determination using sound pressure measurement with a logger and a personal computer, by Suzuki, 45th National Convention Record of Water Supply, pp. 378-379, May 1994.

Experiment (1) on propagation of sound waves caused by sudden water leak, by Yanagisawa and Mori, 43rd National Convention Record of Water Supply, pp. 434-435, May 1992.

Yamazaki, "Abnormal Detection and Prediction", Industrial Investigating Committee, pp. 331-347.

Primary Examiner—H. Williams
Assistant Examiner—J. David Wiggins
Attorney, Agent, or Firm—Fay, Sharpe, Beall Fagan, Minnich & McKee

[57] ABSTRACT

A pipeline breakage sensing system includes a plurality of pressure sensors installed on pipelines to measure pressure of a fluid. Each of these pressure sensors presumes a breakage location in cooperation with other neighboring sensors on the basis of a pressure change of the fluid and transmits information relating to the presumed breakage location. The pipeline breakage sensing system further includes a pressure sensor for detecting the occurrence of a seismic earthquake event, in addition to a managing center for sensing a breakage location on the basis of information transmitted from respective pressure sensors and by calculating a time correlated comparison between the superimposed pressure readings from neighboring pressure sensors used to detect the occurrence of such a fluid pressure change. Thereby, breakage of a pipeline network is sensed and the quantity of flow delivered through an affected pipeline is adjusted, stopped or regulated by control of one or more valves in accordance with a predetermined, weighted system of fluid flow requirements, customer ordered priorities and customer demand levels.

23 Claims, 10 Drawing Sheets

PIPELINE BREAKAGE SENSING SYSTEM AND SENSING METHOD

BACKGROUND OF THE INVENTION

The present invention relates to maintenance and management of life line networks such as water pipe networks or gas pipe networks. In particular, the present invention relates to pipeline breakage sensing systems for rapidly sensing a pipeline breakage or damaged location and supporting a rapid recovery therefrom.

Water and gas pipes serve as life lines indispensable for maintaining daily lives, and they are required to constantly function and to have high reliability. Especially when an abnormality or a disaster has occurred, it is necessary to suppress the damage to a minimum and effect rapid recovery. If some damage has occurred, then it must be sensed together with its location as soon as possible and corresponding action must be taken before the damage is expanded. This is especially true for buried pipes which cannot be monitored directly by human eyes. Therefore, water leak inspection is conducted by dividing a wide supply area into small work divisions. More specifically, the quantity of leakage is derived from the difference between the quantity of water distributed to a district and the quantity of use by customers, and water leak inspection is conducted for each pipeline in the district. As for the method for sensing water leaks, water leakage sounds are perceived, isolated and analyzed in most cases. For example, there is a method of detecting leakage by using a rodlike hearing device and human auditory sense during the night. There is a method of catching water leak sounds in at least two positions by using correlative water leak detectors and presuming the damaged position on the basis of their arrival time difference.

A method of detecting leaks by using human auditory senses during the night is described in "Study on water leak pipeline determination using sound pressure measurement with a logger and a personal computer," by Suzuki, 45th National Convention Record of Water Supply, pp. 378–379, May 1994 (which will hereafter be referred to as "first conventional technique"), for example. According to the method proposed therein, sound pressure measurement is conducted and a diagnosis is effected as to whether water leak has occurred on the basis of features of sound pressure distribution at the time of occurrence of water leak especially in order to lighten the work for inspecting each pipeline. On the other hand, a method of sensing leakage concurrently with occurrence of a water leak is described in "Experiment (1) on propagation of sound waves caused by sudden water leak," by Yanagisawa and Mori, 43th National Convention Record of Water Supply, pp. 434–436, May 1992 (which will hereafter be referred to as "second conventional technique"), for example. The possibility of water leak sensing and position presumption by detecting sound waves generated at the time of pipeline breakage is described therein.

As described above, water leak sensing presently is conducted mainly by using the method of detecting water leak sounds. In this method, the sensing work is conducted during the night when less noises are caused, and all pipes must be inspected while the position is being moved on a road surface. Therefore, the work amount is also large, and its efficiency improvement and its automatization are desired. Since the first conventional technique is a sensing method based upon the water leak sounds, inspection must be conducted during the night and the necessity of conducting work on a pipeline remains. Furthermore, the first conventional technique is a method of finding out a location of a water leak which has already occurred. Therefore, it cannot be said that the first conventional technique is sufficient in the sense of early detection. In other words, the first conventional technique is premised on the existence of water leak and lacks the viewpoint that pipeline breakage should be sensed rapidly at the time of a disaster such as an earthquake. In the sensing method using pressure waves according to the second conventional technique, measurement with far shorter sampling intervals as compared with the pressure monitoring required for the water distribution control is needed. In application to a water pipe network, therefore, more monitoring points are needed. If centralized monitoring is used, therefore, the information volume increases, resulting in increase in cost and degradation in monitoring efficiency.

As evident from the foregoing description, it is desired that any water leak can be sensed as soon as possible with as little information as possible.

SUMMARY OF THE INVENTION

An object of the present invention is to provide a pipeline breakage sensing system and a method for early sensing of a breakage in a pipeline network conveying a fluid.

In accordance with the present invention, a configuration hereafter is described.

A plurality of pressure sensors are installed on pipelines of a pipe network (pipeline network) such as a water pipe network. Each pressure sensor individually senses a leak location in cooperation with other neighboring pressure sensors. In a managing center, a leak detector is installed. The leak detector accumulates presumption results transmitted from the pressure sensors and data stored in the sensors, and conducts management on parameters needed by pressure sensors for a presumption.

Each pressure sensor includes a buffer for temporarily holding time series data of measured pressure, and a wave memory for storing time series data of pressure at the time of occurrence of a leak. In response to a command from a data storage command generator, data held in the buffer and data measured after the occurrence of the leak are stored in the wave memory. Information stored in wave memories of neighboring sensors is taken in by a communication circuit. Using a main memory storing a program and parameters and a processor, the leak location and the leak quantity are presumed. Instead of neighboring sensors, sensors which are not neighboring may be used so long as, for example, the positional relation with respect to the noted pressure sensor (such as the distance or the number of branch points between them) is definite. Furthermore, instead of pressure sensors, sensors measuring situations relating to the movement of the fluid contained in pipelines, such as flow meters, may be used.

On the other hand, the leak detector includes a leak information accumulator for accumulating pressure data stored in the pressure sensor, an alarm generator, responsive to transmission from the pressure sensor, for informing a monitoring person of the occurrence of a leak, and a parameter manager for adjusting parameters to be used by the pressure sensor for presumption.

At the time of occurrence of an earthquake, a large number of leaks occur simultaneously. Therefore, there is a risk that sensors will conduct transmission simultaneously resulting in a congestion state. Therefore, the leak detector of the managing center includes a seismometer for sensing occurrence of an earthquake and generating a signal. The leak detector accumulates data and presumption results stored in the pressure sensors in order.

If a leak is caused in a pipeline conveying a fluid by breakage or the like, then the pressure abruptly decreases and a negative pressure wave is generated. This phenomenon is known. By sensing this, a leak can be found substantially concurrently with occurrence of the leak. If observation is conducted at two or more points, then the leak location and the leak quantity can be presumed for a leak which has occurred between the two points. For implementing this in a widespread water pipeline system, a large number of sensors must be disposed on the pipelines and the pressure wave monitoring must be conducted in a concentrated manner. For detecting the pressure wave, however, measurement with far shorter sampling periods as compared with the pressure measurement typically conducted for water distribution control is needed, and the number of installed sensors must also be significantly increased. If such a large amount of data is subjected to centralized monitoring, then not only does the communication cost increase but also degradation of the monitoring efficiency is caused, and the object cannot be achieved.

Therefore, concurrently with pressure wave sensing conducted by each sensor, data before and after occurrence are stored in the wave memory. By using the communication circuit, pressure wave data sensed by neighboring sensors are also procured. A processor included in each sensor presumes the water leak location (breakage location) and the water leak quantity distributively, and first sends only results of presumption to a leak detector. Thereby, the entire communication volume is significantly reduced, and the monitoring efficiency is increased.

At the time of occurrence of an earthquake, a seismometer of the leak detector generates a signal. Data and presumption results stored in the pressure sensors are accumulated in order. Thereby, sensors are prevented from simultaneously conducting transmission. Occurrence of a congestion state is thus prevented.

DESCRIPTION OF THE PREFERRED EMBODIMENTS

Figure 1A:
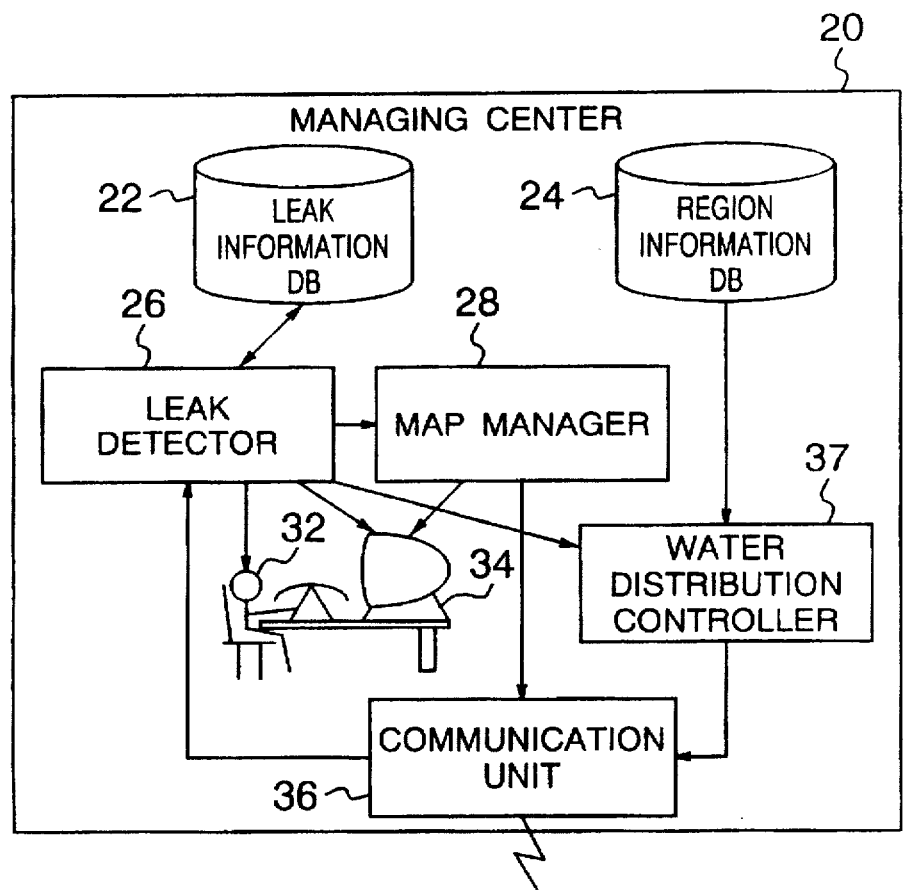
FIGS. 1A and 1B are entire system configuration diagrams according to the present invention.
Figure 1B:
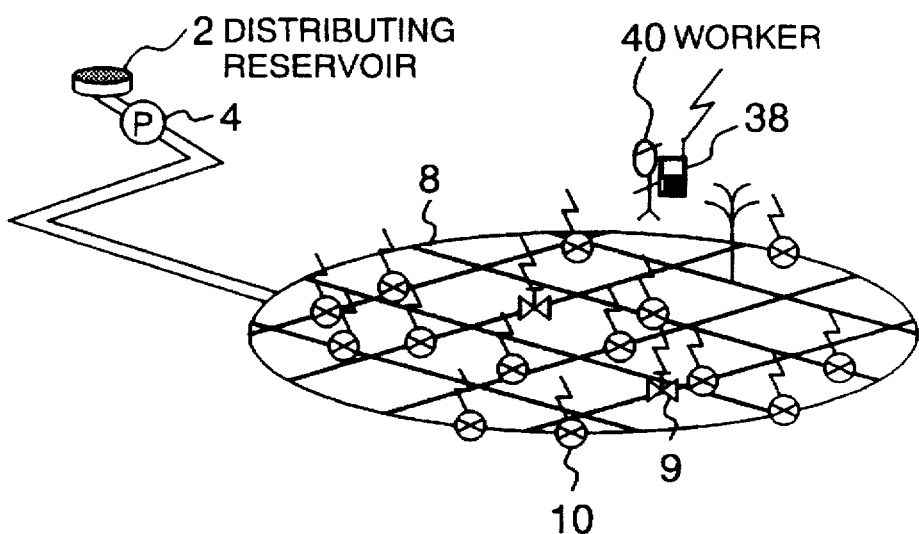

Preferred embodiments in the case where the present invention is applied to a water pipe network will be described by referring to the drawings. FIGS. 1A and 1B are entire system configuration diagrams according to the present invention. Clean water stored in a distributing reservoir 2 is pressurized and sent by a pump 4 and delivered to customers via a water pipe network 8. Since the water pipe network 8 is typically buried under the ground, it is difficult to sense any damage. In many cases, therefore, disposition is conducted in response to a report from a customer after a large quantity of leak water has flowed out on a road surface. In accordance with the present invention, therefore, a plurality of sensors (pressure sensors) 10 are disposed in the pipe network in order to sense a water leak immediately after it has occurred (i.e., before notice from a customer). Respective sensors sense changes of physical situations of water in a pipeline caused by occurrence of a water leak. In the case of a pressure sensor, a pressure wave generated by a sudden drop of pressure at the time of occurrence of a water leak is sensed. The typical pressure sensors are often disposed also when centralized control of valves 9 aiming at making the pressure distribution in the pipe network uniform is implemented in order to ensure the service pressure. Therefore, the sampling interval required of the typical pressure sensors is not sufficient for detecting the pressure wave, and measurement with an extremely short sampling interval becomes necessary. If centralized monitoring is used for this, however, there is a fear of lowering in monitoring efficiency caused by an increase in information volume. Furthermore, for fulfilling the function sufficiently even at the time of occurrence of an earthquake or the like often causing breakage, wireless information transmission is desirable. However, there is a limit in high-speed transmission.

In accordance with the present invention, water leak sensing in real time with an appropriate information volume is achieved by providing each sensor 10 with intelligence. By conducting information exchange with neighboring sensors via communication, each sensor presumes the water leak location and the water leak quantity distributively and sends results thereof to a managing center by means of wireless communication or satellite communication.

The water leak location and quantity sensed by each sensor 10 are inputted to a leak detector 26 via a communication unit 36 of the managing center 20. In addition to issuing an alarm to a monitoring person 32, the leak detector 26 transmits the sensed information to a water distribution controller 37 and a map manager 28. The water distribution controller 37 transmits a set point of a remote controllable valve via the communication unit 36. The map manager 28 superimposes received leak information on map information read from region information DB (database) 24 and outputs the result to a display unit 34. If the following items are stored in the region information DB 24 as map information, breakage can be sensed more precisely and more rapidly. For example, tendency of each pipeline to break, readiness of sensing conducted by the sensor, degree of influence to the customer (how many customers are influenced) at the time of closure of each valve, influence of leak in each pipeline on customers when it has occurred, and the flow rate in each pipeline can be mentioned. The monitoring person 32 makes contact with a worker 40 who has gone to the actual spot. The worker 40 possesses a portable information terminal 38. By using this portable information terminal 38, the worker 40 is guided by the monitoring person 32 and receives map information from the communication unit 36. Furthermore, the worker 40 reports the actual leak location and leak quantity obtained as a result of the inspection to the monitoring person 32 and transmits them to the leak detector 26 as well via the communication unit 36. In the leak detector 26, the result of presumption performed by using the sensor 10 is compared with the result obtained by the actual inspection and parameters which were used for the presumption are adjusted confirmed or justified. For this purpose, data of the pressure wave sensed by the sensor 10 are procured via the communication unit 36. The sensor 10 is adapted to store data of the pressure wave when the sensor has sensed it. The leak detector 26 manages parameter values of all sensors. Herein, parameter values are updated by comparison between the result of presumption and the result of inspection. The leak detector sends updated parameter values to the sensor 10.

The leak detector 26 has a function of sensing an earthquake. When a predetermined seismic intensity is exceeded, the leak detector 26 transmits a data holding command signal simultaneously to respective sensors 10 via the communication unit 36. Since many pipeline breakage events occur simultaneously at the time of occurrence of an earthquake, the leak detector 26 provides restoration locations with priority order on the basis of relations between leak locations and leak quantities, and outputs a priority order list to a display unit 34. In accordance with the priority order, the monitoring person 32 gives a command to the worker 40.

In order to determine the priority order, contents stored in the region information DB 24 are used. In other words, the priority order is determined depending upon how much the leak location affects customers. Locations affecting many customers are provided with high priority. The priority order may be determined on the basis of demand quantity of affected customers for a predetermined time.

Furthermore, locations relating to specific important customers may be provided with high priority. Furthermore, when determining the priority order on the basis of the leak quantity, locations having large leak quantities at the time of sensing may be provided with high priority or the leak quantity until the restoration time may be presumed to provide locations with priority order on the basis of a result of presumption. Presumption of the leak quantity until the time of restoration can be performed by using the sensed pressure change and stored flow rate.

Furthermore, instead of using only either the leak location or leak quantity, the priority may be determined while holding the balance between them. For example, points are given to each of the leak location and the leak quantity according to the degree thereof, and the priority order is determined on the basis of the total number of points.

Determination of priority order of restoration locations has heretofore been described by referring to the time of occurrence of an earthquake. Besides the time of occurrence of an earthquake, however, the determination of priority order of restoration locations may be also carried out when water leak (pipeline breakage) has been sensed in a plurality of locations.

Furthermore, in accordance with the present invention, the flow rate of the pipeline is adjusted by automatically closing a valve, for example, after the water leak has been sensed. Association of sensors with valves are stored in the region information DB 24, and valves are closed so as to reduce the influence upon customers. Furthermore, sensors and valve may be stored in association beforehand, and a valve to be closed may be determined according to the sensor which has sensed leak.

Figure 2:
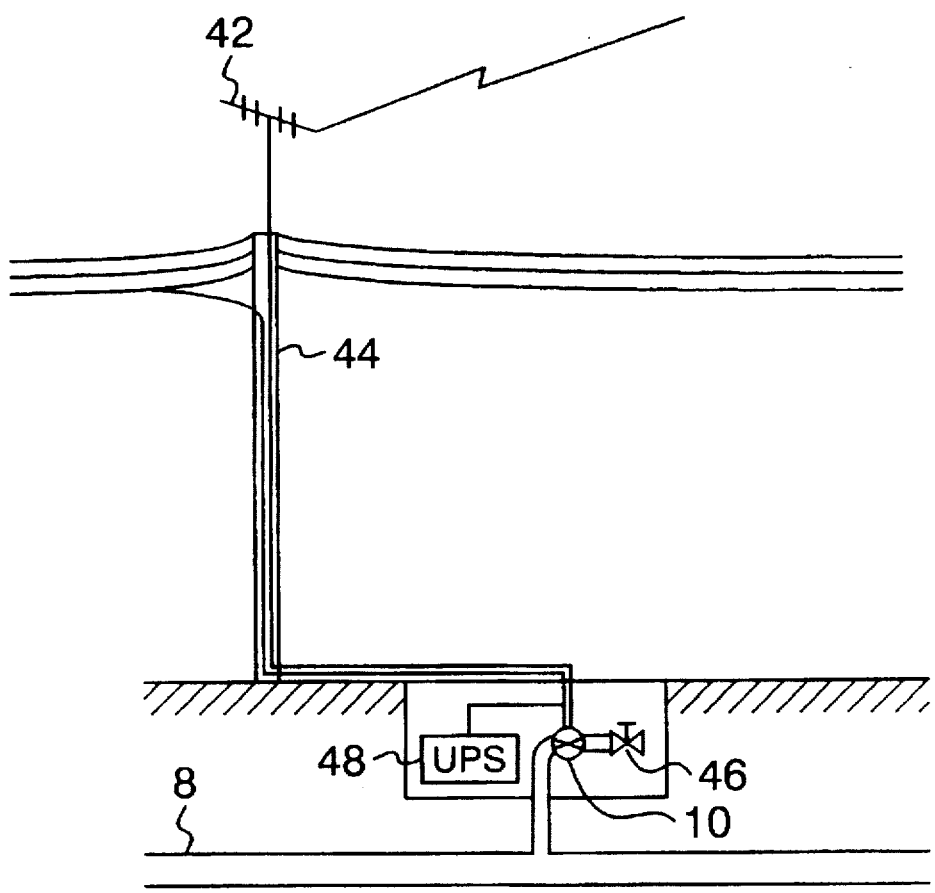
FIG. 2 is a diagram showing an example of installation of a sensor.

FIG. 2 shows an example of installation of a sensor 10. The more sensors, the better from the viewpoint of accuracy of sensing. For that purpose, it is desirable that installation is easy and the cost of construction is low. Since the pipelene network 8 is typically buried under a road, however, the cost of construction needed to install the sensors is high. As an example for implementing installation with a relatively low cost, an example of installation using a fireplug box and an electric light pole is shown. As illustrated, the sensor 10 is attached to a fireplug 46. In order to conduct wireless information transmission to a center, an antenna 42 is attached to an electric light pole 44, and power is also derived therefrom. Furthermore, in order to fulfill the function even at the time of a disaster, an uninterruptible power system (UPS) 48 is connected as a countermeasure against power failure.

Figure 3:
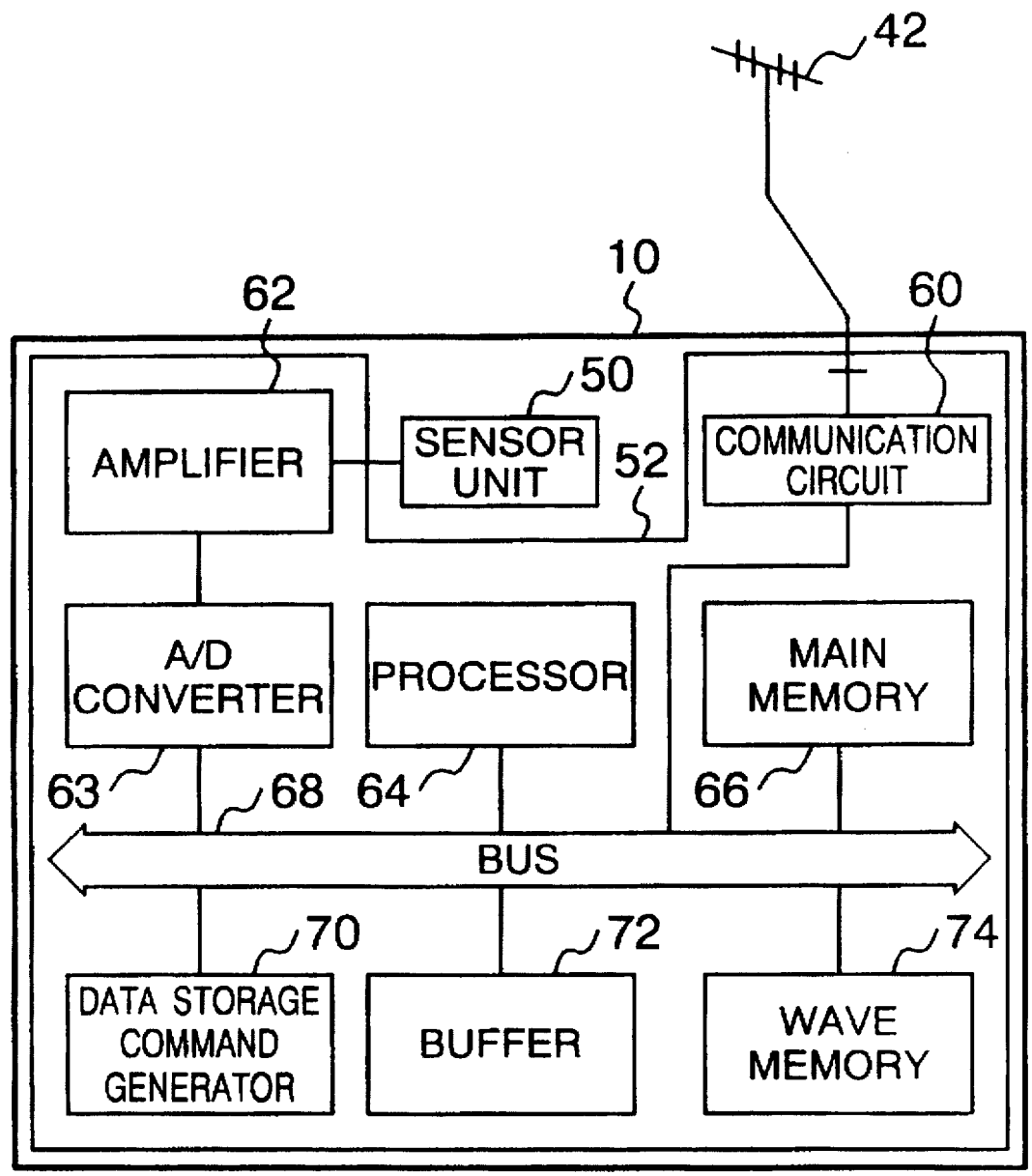
FIG. 3 is a detailed configuration diagram of a pressure sensor having a water leak presumption capability.

Operation of each circuit will now be described by using an internal configuration diagram of the sensor 10 shown in FIG. 3. As described above, the sensor 10 itself has intelligence presuming the leak location and the leak quantity. Therefore, data measured by a sensor unit 50 are processed by a data processor 52. A pressure value measured by the sensor unit 50 is amplified by an amplifier 62, converted into a digital signal by an A/D converter 63, and stored in a buffer 72. The buffer 72 stores time series data corresponding to a fixed time interval. When new data is inputted, the oldest data is erased. Thus the newest data is held in the buffer 72. A data storage command generator 70 is triggered by a sort of pressure wave detection such as a pressure difference as compared with one time interval before becoming at least a fixed value or a high-frequency component being contained in the measured value as a result of a sudden change. Upon this trigger, the data storage command generator 70 issues an signal for copying contents stored in the buffer and the sensing time into a wave memory 74. Thereafter, the data storage command generator 70 exercises control for a fixed time interval so as to subsequently write the measured data into the wave memory 74. Also in the case where a data holding signal is received from the managing center as a result of occurrence of an earthquake, the data storage command generator 70 issues the signal in the same way and exercises control so as to write data into the wave memory 74. In this way, the time when the pressure wave or the earthquake has been sensed and pressure time series data of a fixed interval before and after the time are preserved in the wave memory 74. A series of these operations may be implemented by means of hardware such as the data storage command generator 70, or it may be operated by means of software such as software on a main memory 66. When storage of data into the wave memory has been completed, a processor 64 gives a command to a communication circuit 60 to communicate with neighboring sensors. In the main memory 66, numbers of neighboring sensors are stored beforehand. Communication with all sensors listed in the main memory 66 is conducted in order. If the other party of communication is fixed, the processor 64 determines whether the sensor of the other party also has held data in its wave memory. If the data are held, the processor 64 takes in the content and writes the content in its own main memory. Furthermore, the processor 64 transmits data held in its own wave memory to the sensor of the other party. By comparing pressure wave data of two locations, the processor 64 presumes the leak location and the leak quantity. The processor 64 gives a command to the communication circuit 60 again to communicate with the managing center and informs the managing center of the result of presumption. Exchange of commands and data between the processor 64 and each circuit is conducted via a bus 68.

Furthermore, an example obviating the need of transmission from all sensors 10 to the managing center will now be described. Sensors are divided into groups. Each group includes a pluraity of sensors, and one sensor (or a plurality of sensors) is selected as a representative sensor. To the representative sensor, information sensed by other sensors included in the group is transmitted. To the managing center, information is transmitted from the representative sensor. At that time, all of the information from all sensors included in the group may be transmitted or doubled information may be deleted by the representative sensor to transmit only the minimum information needed. Furthermore, instead of using the representative sensor, a dedicated information transmission unit may be installed in each group. By these configurations, the information to the managing center can be prevented from becoming congested.

Figure 4:
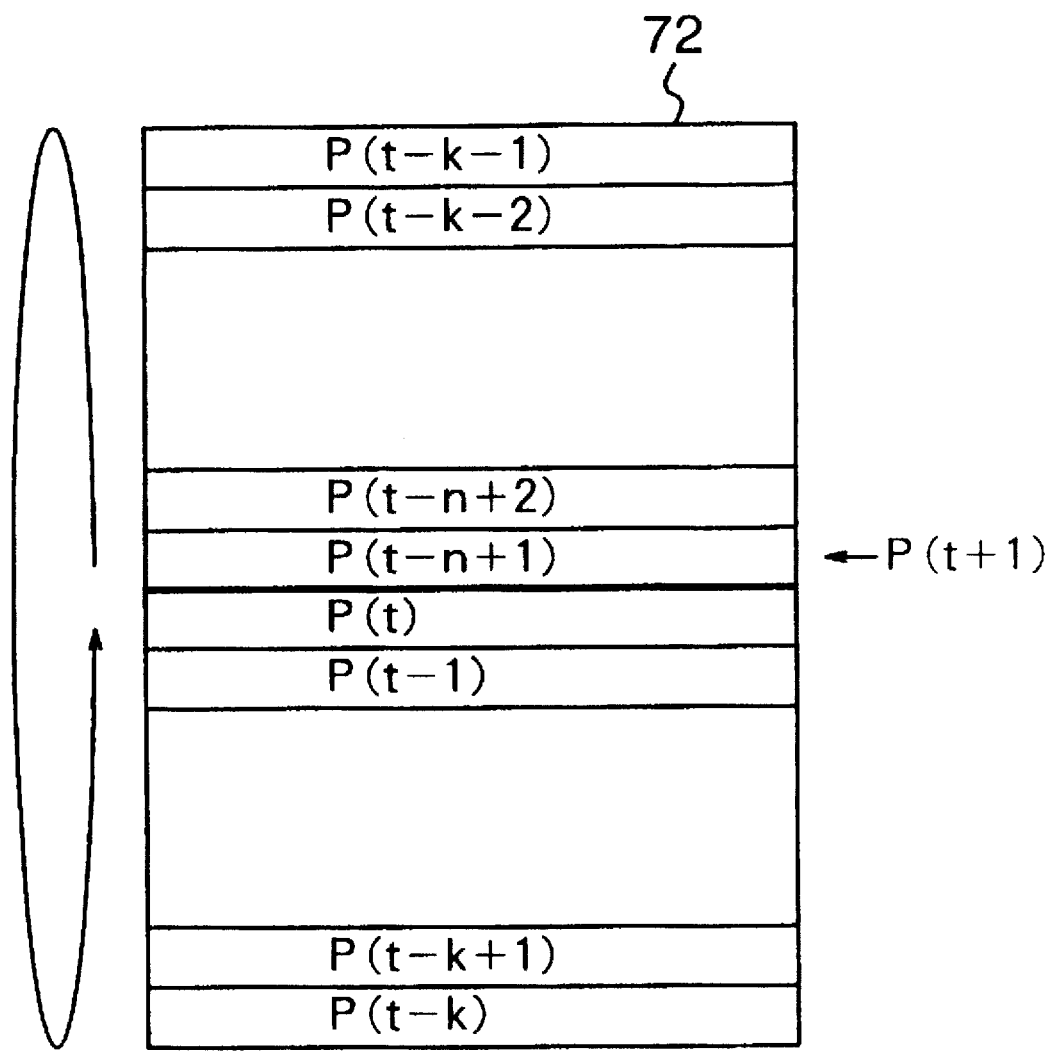
FIG. 4 is a diagram showing how to store data in a buffer included in the sensor.

FIG. 4 shows storage of data in the buffer 72. In other words, FIG. 4 shows the storage state of the buffer at time t. P(t) represents a pressure value measured at the time t. The buffer is configured so as to hold data corresponding to n time points. P(t−n+1) through P(t) are stored as illustrated. At the next time point t+1, the portion which has stored the oldest data P(t−n+1) till then is rewritten to store the newest data P(t+1). By thus using storage areas cyclically, the buffer 72 always holds the newest pressure data corresponding to n time points. The magnitude of n is sufficient if a change of situation can be sensed. At least, n must have a magnitude corresponding to the time difference required for the pressure wave to arrive at a neighboring sensor. Therefore, n should be greater as the number of installed sensors becomes smaller and the spacing from the neighboring sensor becomes longer. The magnitude of n is determined according to the distance from the neighboring sensor. In the case where only sensors having fixed n can be prepared for some reason, the distance between neighboring sensors is determined according to the magnitude of n.

Figure 5:
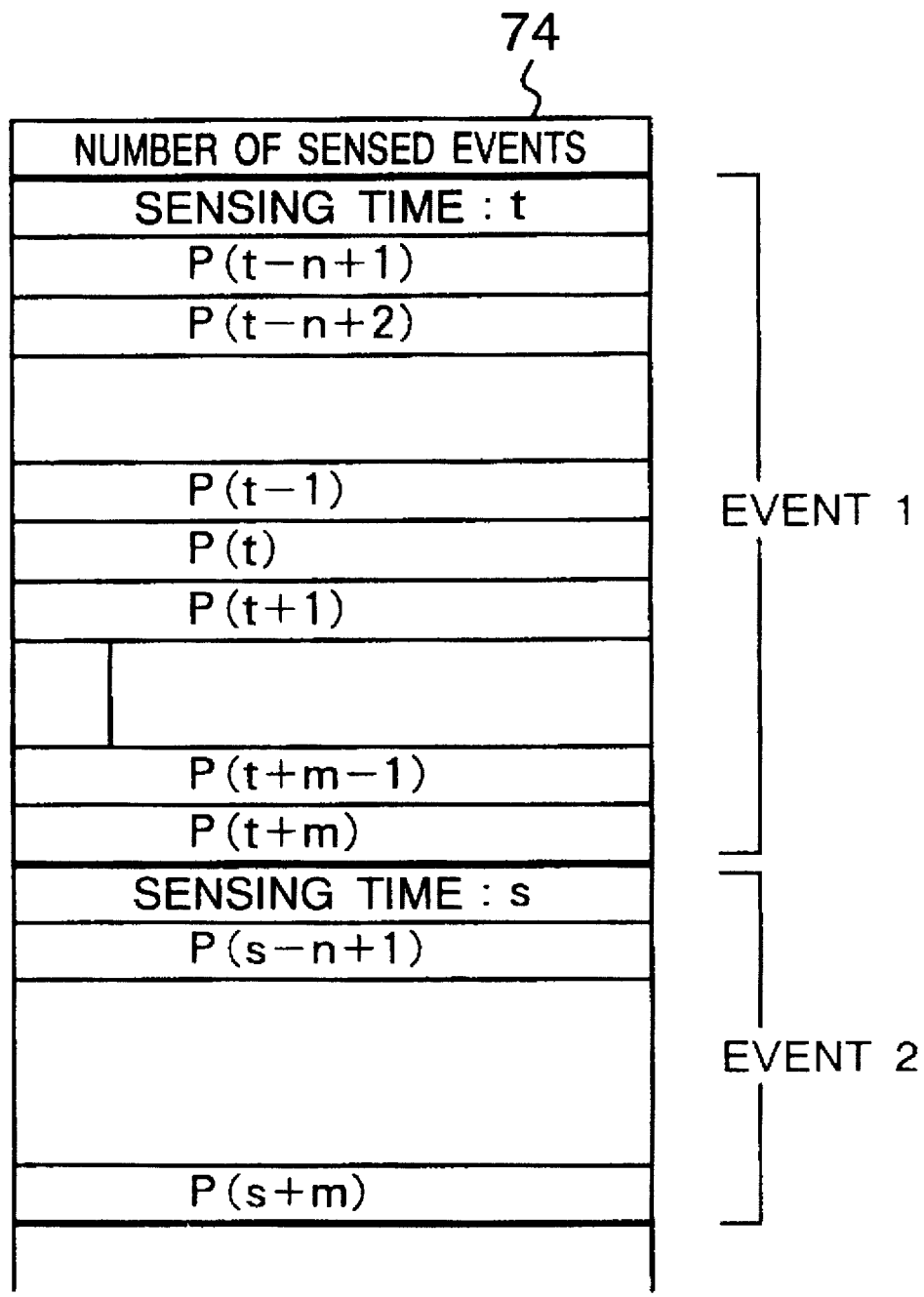
FIG. 5 is a diagram showing how to store data in a wave memory included in the sensor.

FIG. 5 shows how to store data into the wave memory 74. In the wave memory 74, a plurality of pressure wave data can be stored. The number of sensed events is stored in the first place. Thereafter, time series data of measured pressure including the sensed time and the sensed pressure wave are stored as one set of pressure wave data. Upon sensing the pressure wave, the newest pressure data corresponding to n time points are transferred from the buffer to the wave memory as already described. Thereafter as well, measured pressure data are stored in the wave memory for some time. In the example shown in FIG. 5, the pressure wave is sensed at time t, and pressure data P(t-n+1) through P(t) corresponding to n time points held in the buffer and pressure data P(t+1) through P(t+m) corresponding to m subsequent time points are stored. Pressure wave data generated at a different time s is stored. When this data is stored, the number of sensed events located at the head is increased. These data in the wave memory are erased after being subjected to polling from the managing center for detailed analysis after recovery from the breakage and transmitted to the managing center.

Figure 6:
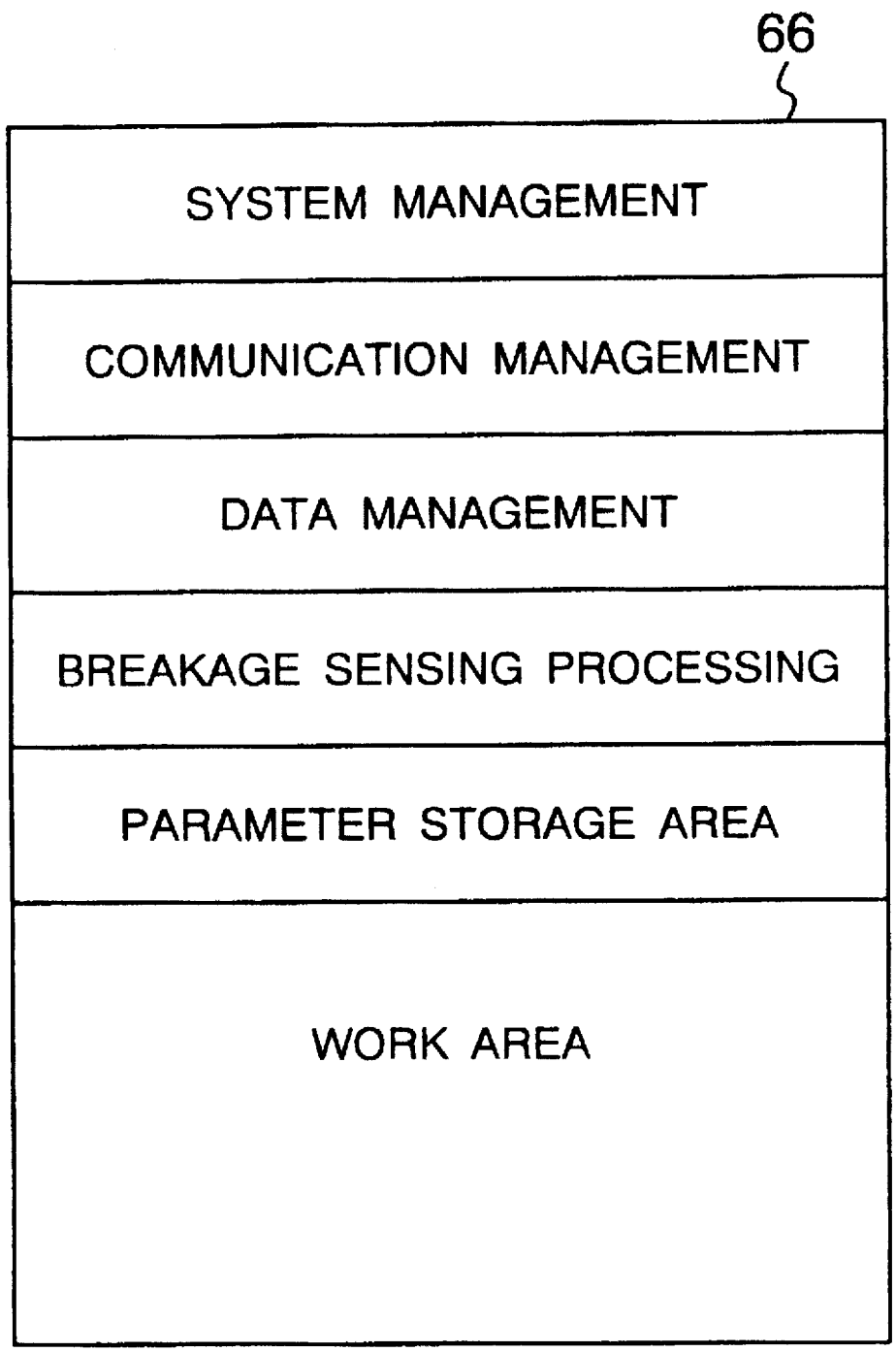
FIG. 6 is a schematic memory map of a main memory included in the sensor.

FIG. 6 is a schematic memory map of the main memory 66. As shown in FIG. 6, programs of system management, communication management, data management and breakage sensing processing are stored. The remainder is used as a parameter storage area and a work area for the programs. The system management controls the entire processing flow and gives commands to respective programs described hereafter. The communication management transmits and receives data with neighboring sensors and with the managing center. With neighboring sensors, the communication management exchanges pressure wave data stored in the wave memory. The exchange is conducted on the basis of a list of neighboring sensors stored in the parameter storage area. Pressure wave data received from the neighboring sensors are stored in the work area. For the managing center, the communication management sends the sensed contents, transmits the data of the wave memory according to polling from the center, and receives the parameters for sensing obtained as a result of analysis performed in the center. The data management stores/transfers the measured pressure data in/to the buffer and the wave memory. Furthermore, in the case where the pressure wave sensing is implemented by means of software instead of hardware such as the data storage command generator 70, the data management includes a sensing program and conducts sensing. The breakage sensing processing compares pressure wave data sensed in two locations and presumes the breakage location and the leak quantity. Detailed processing will be hereafter described.

First of all, the arrival time difference of the pressure wave between two locations A and B is made equal to a time difference maximizing the correlation coefficient of waveforms in respective locations, and it is defined as MAX satisfying expression 1 shown below.

$$\phi_{AB}(\tau_{MAX}) = \underset{\tau}{\text{MAX}} (\phi_{AB}(\tau)) \quad \text{(expression 1)}$$

$\phi_{AB}(\tau)$ is given by the following expression 2.

$$\phi_{AB}(\tau) = \sum_{k=t-n+1}^{t+m} P_A(K) \cdot P_B(k+\tau) \quad \text{(expression 2)}$$

$P_A$ and $P_B$ are pressure wave data respectively of the two locations. If $P_B(k+\tau)$ becomes data outside the stored section, a time point located at an end point of the section is used instead as represented by expression 3 and expression 4.

(1) When $k+\tau<t+n-1$, $$P_B(k+\tau)=P_B(t+n-1) \quad \text{(expression 3)}$$

(2) When $k+\tau>t+m$, $$P_B(k+\tau)=P_B(t+m) \quad \text{(expression 4)}$$

It is now assumed that "a" is the propagation speed of the pressure wave, d is the distance between two locations A and B, and $d_A$ and $d_B$ are distances from the breakage point to the two locations A and B, respectively. When the following expression 5 is satisfied, it is implied that the pressure wave propagates between A and B in the same direction. Therefore, the leak location is judged not to be between A and B.

$$a \cdot \tau_{MAX} = d \quad \text{(expression 5)}$$

When the following expression 6 is satisfied, the leak location is judged to be between A and B. And from the expression 7 and expression 8, $d_A$ and $d_B$ are derived and leak locations are presumed.

$$a \cdot \tau_{MAX} < d \quad \text{(expression 6)}$$

$$a \cdot \tau_{MAX} = |d_A - d_B| \quad \text{(expression 7)}$$

$$l = d_A + d_B \quad \text{(expression 8)}$$

Furtermore, it is known that the magnitude of the pressure wave in the leak location and the leak quantity are related by the following equation.

$$\Delta p = \frac{aQ\gamma}{2gS} \quad \text{(expression 9)}$$

p is the magnitude of pressure wave in the leak location. Q is the leak quantity. γ is the specific gravity of the fluid, and g is the acceleration of gravity. S is the cross-sectional area of the pipeline. Furthermore, the propagation distance of the pressure wave and attenuation thereof are related by the following equation.

$$\Delta p' = \Delta p \cdot \exp(-kL) \quad \text{(expression 10)}$$

p' is the magnitude of the pressure wave in the mesuring location, and k is the distance damping coefficient. L is the distance between the leak location and the measuring location. From expression 9 and expression 10, therefore, the leak quantity can be presumed. However, the propagation speed "a" and the distance damping coefficient k differ depending upon the state of the pipeline and each of them can be considered to be a kind of parameter. The result of inspection conducted at the time of recovery after occurrence of breakage is compared in the managing center with the result of presumption conducted by using the measured pressure wave. Tuned results are transmitted. Parameters stored in the main memory possessed by each sensor are updated.

Figure 7:
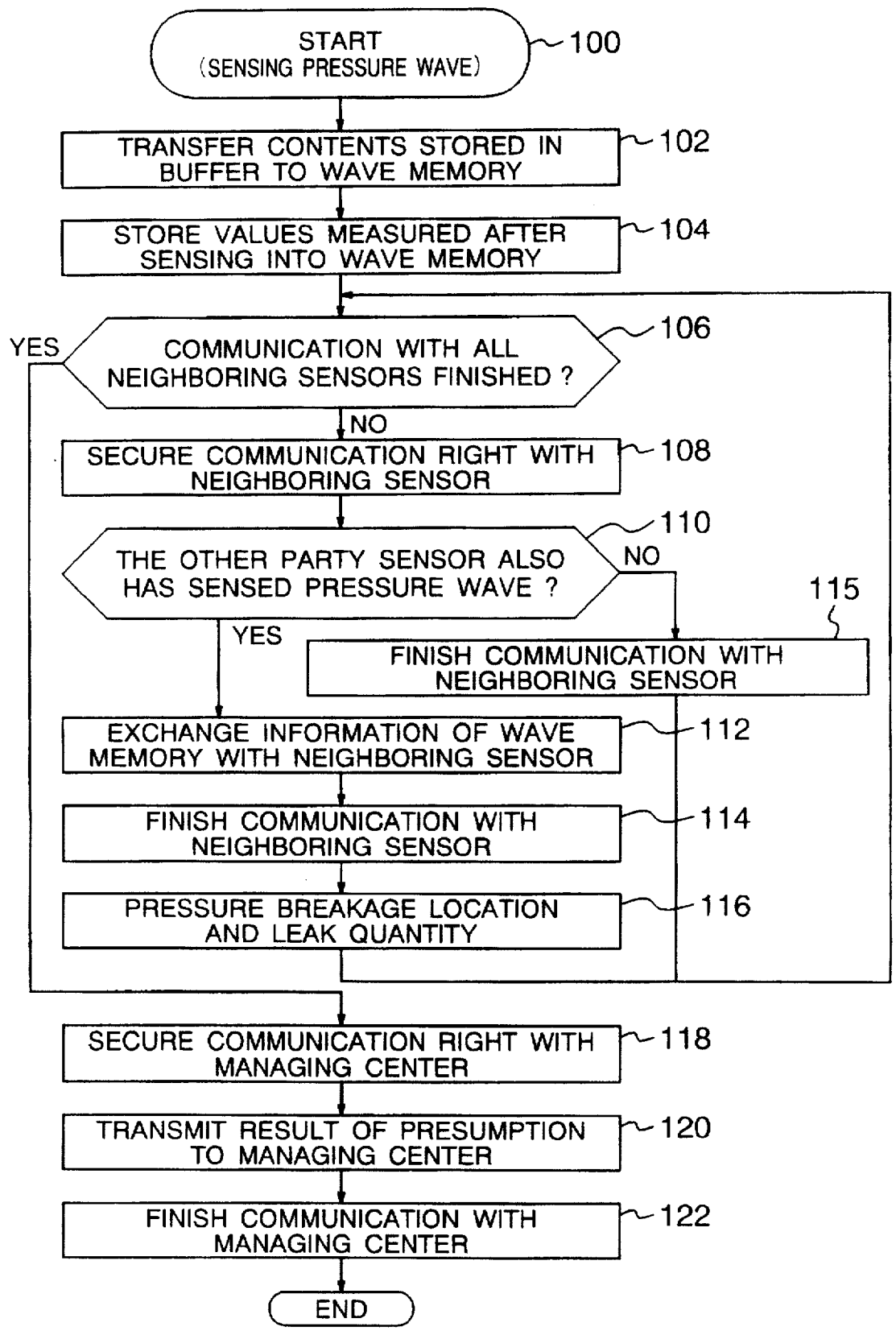
FIG. 7 is a diagram showing the operation flow of the sensor at the time of pressure wave sensing.

FIG. 7 shows the operation flow of each sensor at the time of pressure wave sensing. On the basis of some criterion, occurrence of a pressure wave is sensed. For example, on the basis of the pressure difference as compared with one time interval before reaching a fixed value or more than a predetermined threshold amount of measured pressure change, or on the basis of a high-frequency component being contained in the measured value because of a sudden change, occurrence of a pressure wave is sensed (step 100). Sensing may be implemented by means of hardware such as the data storage command generator, or it may be implemented by means of software such as software on a main memory. In response to a signal outputted from the data storage command generator or the processor, the contents stored in the buffer and the sensing time are transferred to the wave memory (step 102). Thereafter, the measured data is written into the wave memory subsequently for a fixed interval (step 104). Also in the case where a data holding signal is received from the managing center as a result of occurrence of an earthquake, a series of these operations is conducted in the same way. When storage of data into the wave memory has been completed, the communication management program communicates with neighboring sensors in order on the basis of the number list of neighboring sensors stored in the main memory. If the other party of communication is fixed (step 108), it is determined whether the sensor of the other party also has held data in its wave memory (step 110). If the data are held, the contents are taken in and the contents are written in its own main memory. Furthermore, data held in its own wave memory are transmitted to the sensor of the other party (step 112). Communication with the neighboring sensor is finished (step 114). By comparing pressure wave data of two locations, the leak location and the leak quantity are presumed (step 116). If the neighboring sensor has not sensed the pressure wave, the communication is immediately finished (step 115). If communication with all neighboring sensors has been completed (step 106), then communication with the managing center is conducted (step 118), the result of presumption is transmitted (step 120), and the communication is finished (step 122). After the communication has been finished, the result of presumption is stored in the region information DB. By conducting this some times, locations susceptible to leak (breakage) can be known. In the case where an earthquake has occurred again, therefore, it can be coped with according to this data. For example, it can be mentioned that data of the locations susceptible to breakage are collected in more detail than other locations. At normal times as well, data may be collected in more detail than other locations. Since locations in which breakage has occurred many times can be considered to have weak ground, strengthening construction may be conducted.

Figure 8:
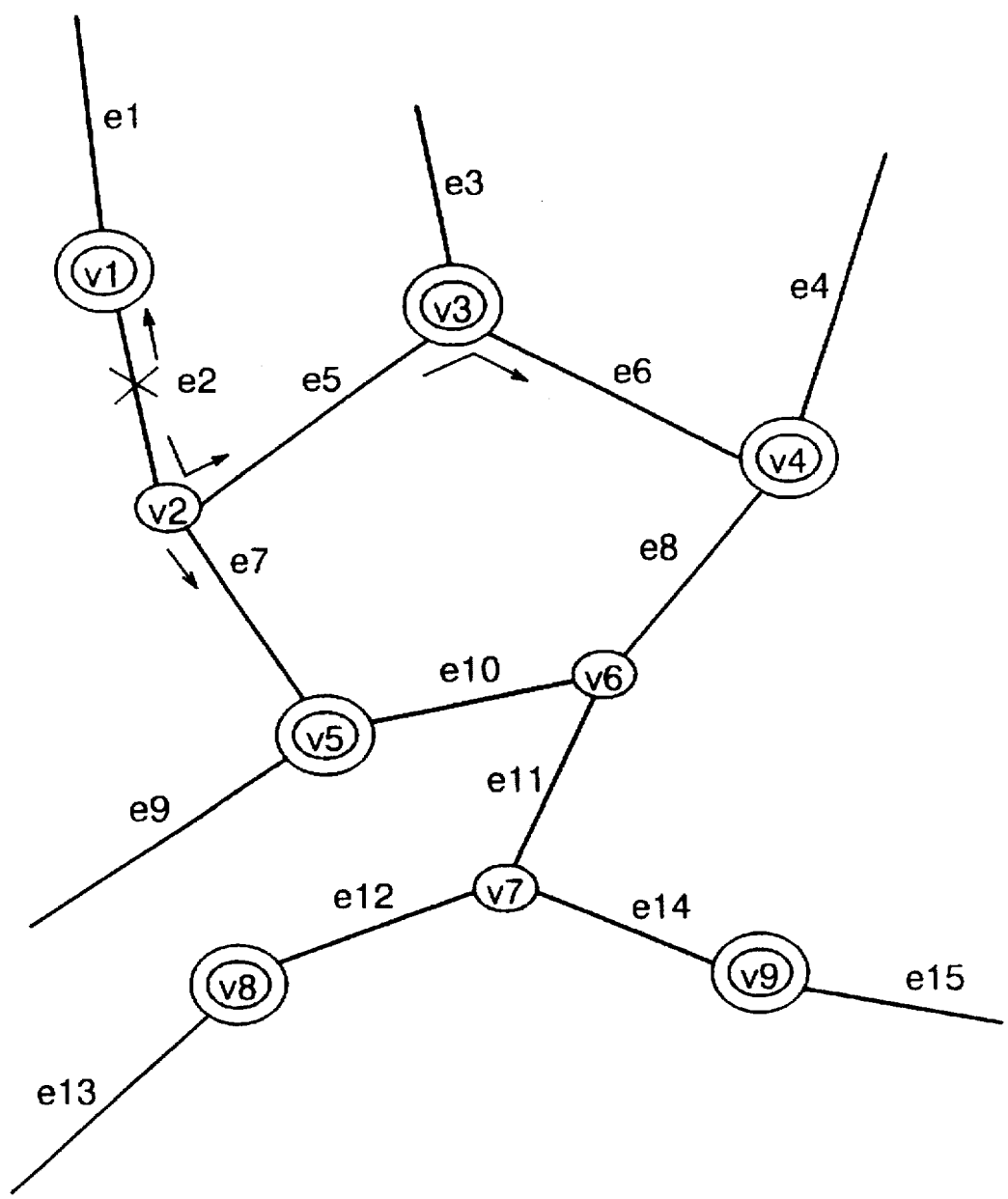
FIG. 8 is a diagram showing a part of a pipe network having sensors installed therein.

FIG. 8 shows a part of a pipe network having pressure sensors installed therein. In FIG. 8, e1 through e15 denote pipes and v1 through v9 denote nodes. It is now assumed among them v1, v3, v4, v5, v8 and v9 are nodes each having a pressure sensor installed thereon. Hereafter, cooperative operation conducted by these sensors will be described. It is now assumed that breakage has occurred in the pipeline e2. Pressure waves are propagated through paths v1-e1, v2-e5-v3-e6-v4 and v2-e7-v5 as represented by illustrated arrows. The sensor of v1 senses the pressure wave and communicates with neighboring sensors, i.e., sensors of v3 and v5. By comparing pressure waves sensed at v1 and v3, the sensor of v1 recognizes that the breakage has occurred on the path of e2-v2-e5. On the basis of an arrival time difference, the sensor of v1 senses that the breakage has occurred on e2. By communicating with the sensor of v5 in the same way, the sensor of v1 recognizes that the breakage has occurred on the path of e2-v2-e7. On the basis of an arrival time difference, the sensor of v1 senses that the breakage has occurred on e2. The sensor of v1 transmits respective presumption results to the managing center. On the other hand, the sensor of v3 communicates with neighboring sensors, i.e., sensors of v1, v4 and v5. On the basis of the result of communication with v1, it can be sensed that the breakage has occurred on e2 in the same way as the foregoing description. As a result of communication with v4, the arrival time difference becomes equal to the time required for the pressure wave to pass through v3-e6-v4. Therefore, it is recognized that there is no breakage location on this path. As a result of communication with v5, however, it is recognized that breakage has occurred on the path of e5-v2-e7. Therefore, a wrong breakage location is presumed. In the same way, the sensor of v5 also effects correct recognition as a result of communication with v1. As a result of communication with v3, however, a wrong breakage location is presumed. As understood from this example, the breakage location can be certainly presumed in the case where a branch point is not present on the way as in v3–v4. In the case where a branch point having no sensors installed thereon such as v2 is present, however, only the sensor having no branch points between the breakage location and itself (the sensor of v1 in this example) derives coincident presumption results from results of communication with all neighboring sensors. Furthermore, in the case where breakage has occurred in a pipeline sandwiched between branch points having no sensors installed thereon such as e11, any of v4, v5, v8 and v9 includes one wrong presumption result. When breakage has occurred on e8, only the sensor of v4 derives coincident presumption results from results of communication with all neighboring sensors. In the same way, only the sensor of v5 derives coincident presumption results from results of communication with all neighboring sensors, when breakage has occurred on e10. When breakage has occurred on e12, only the sensor of v8 derives coincident presumption results from results of communication with all neighboring sensors. When breakage has occurred on e14, only the sensor of v9 derives coincident presumption results from results of communication with all neighboring sensors.

In the case where any sensor does not derive coincident presumption results, it can be presumed that the breakage has occurred on e11. When branch points having no sensors exist, each sensor alone includes a wrong presumption result in some cases. In the managing center, however, the breakage location can be determined on the basis of the results of presumption given from respective sensors and the connection state of the pipe network. If a sensor is certainly installed on each branch point, the breakage location can be presumed more certainly. Sensors may be installed in a plurality of locations on the same number of installed sensors is increased.

Figure 9:
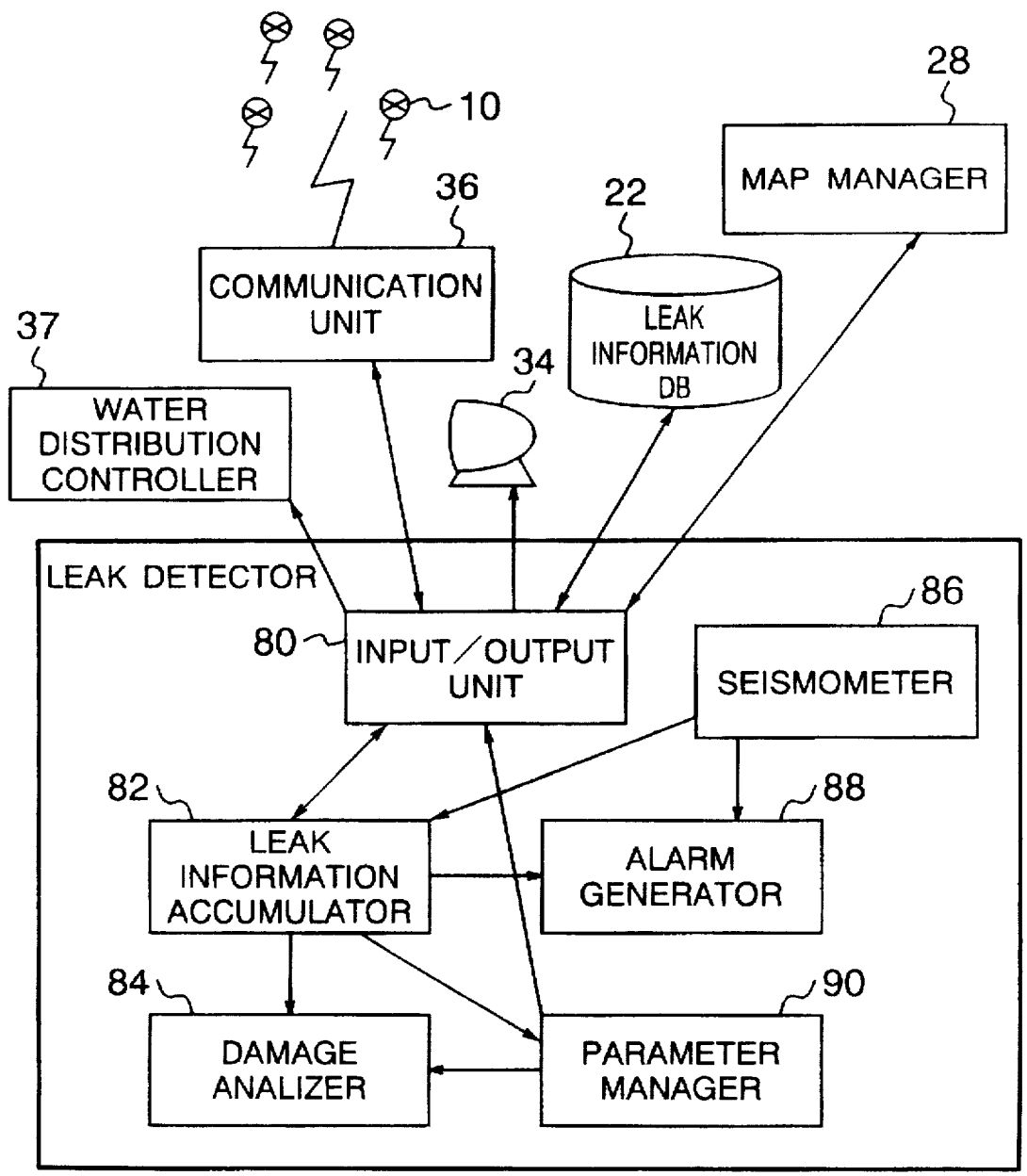
FIG. 9 is a detailed configuration diagram of a leak detector.

FIG. 9 shows an internal configuration diagram of the leak detector 26 installed in the managing center. Information concerning the leak location and the leak quantity sensed by the sensor 10 is transmitted to the leak detector 26 via the communication unit 36. Leak information is collected into a leak information accumulator 82 via an input/output unit 80. The leak information accumulator 82 procures pipeline connection information from the map manager 28, summarizes presumption results of the sensors 10, determines the final leak location and leak quantity, issues a command to an alarm generator 88, and transfers information to the map manager 28. Furthermore, by polling the sensors which have issued sensing information in order via the communication unit 36, the leak information accumulator 82 accumulates measured information of the pressure wave. Furthermore, via the communication unit 36, the leak information accumulator 82 accumulates the actual leak location and leak quantity obtained as a result of inspection and transmitted from the worker 40 who went to the actual spot. The leak information accumulator 82 stores the accumulated information into the leak information DB 22, and transmits the information to a damage analyzer 84 and a parameter manager 90 as occasion demands. The damage analyzer 84 deduces a valve to be manipulated on the basis of the breakage state, and informs the water distribution controller 37 and the map manager 28 of the valve to be manipulated together with the leak information. The water distribution controller 37 transmits the set point of a remote-controllable valve via the communication unit 36. A parameter manager 90 manages parameter values of all sensors. By referring to the results presumed by the sensors, the results obtained by inspection, and past results stored in the leak information DB 22, the parameter manager 90 conducts tuning of parameters used for the presumption. The updated parameter values are transmitted to the sensors 10.

Upon excess over a predetermined seismic intensity, a seismometer 86 transmits a signal to the leak information accumulator 82 and the alarm generator 88. The leak information accumulator 82 simultaneously transmits a data holding command signal to respective sensors 10 via the communication unit 36. When an earthquake has occurred, breakage occurs simultaneously in many places and a large number of pressure waves are generated, resulting in a fear of sensing becoming difficult. If local decision conducted by respective sensors is used, there is a possibility that there is a limit. Therefore, data at the time of occurrence of an earthquake are held in all sensors irrespective of whether pressure has been sensed. Thus the data at the time of occurrence of the earthquake can be used for detailed analysis conducted thereafter. If the information at the time of an earthquake is stored in the region information DB 24 as described above, data may be held by only sensors corresponding to only locations susceptible to leak (breakge) on the basis of the information. The leak information accumulator 82 effects polling of all sensors 10 and procures pressure wave data in order. Furthermore, via the communication unit 36, the leak information accumulator 82 accumulates the actual leak location and leak quantity obtained as a result of inspection and transmitted from the worker 40 who went to the actual spot, in the same way as the case other than earthquakes. The leak information accumulator 82 stores the accumulated information into the leak information DB 22, and transmits the information to the damage analyzer 84 and the parameter manager 90 as occasion demands. At the time of occurrence of an earthquake, it becomes extremely difficult to give commands on restoration work. Therefore, the damage analyzer 84 provides a large number of breakage locations with priority order on the basis of leak quantities and breakage locations, and outputs the priority order list to the display unit 34.

Figure 10:
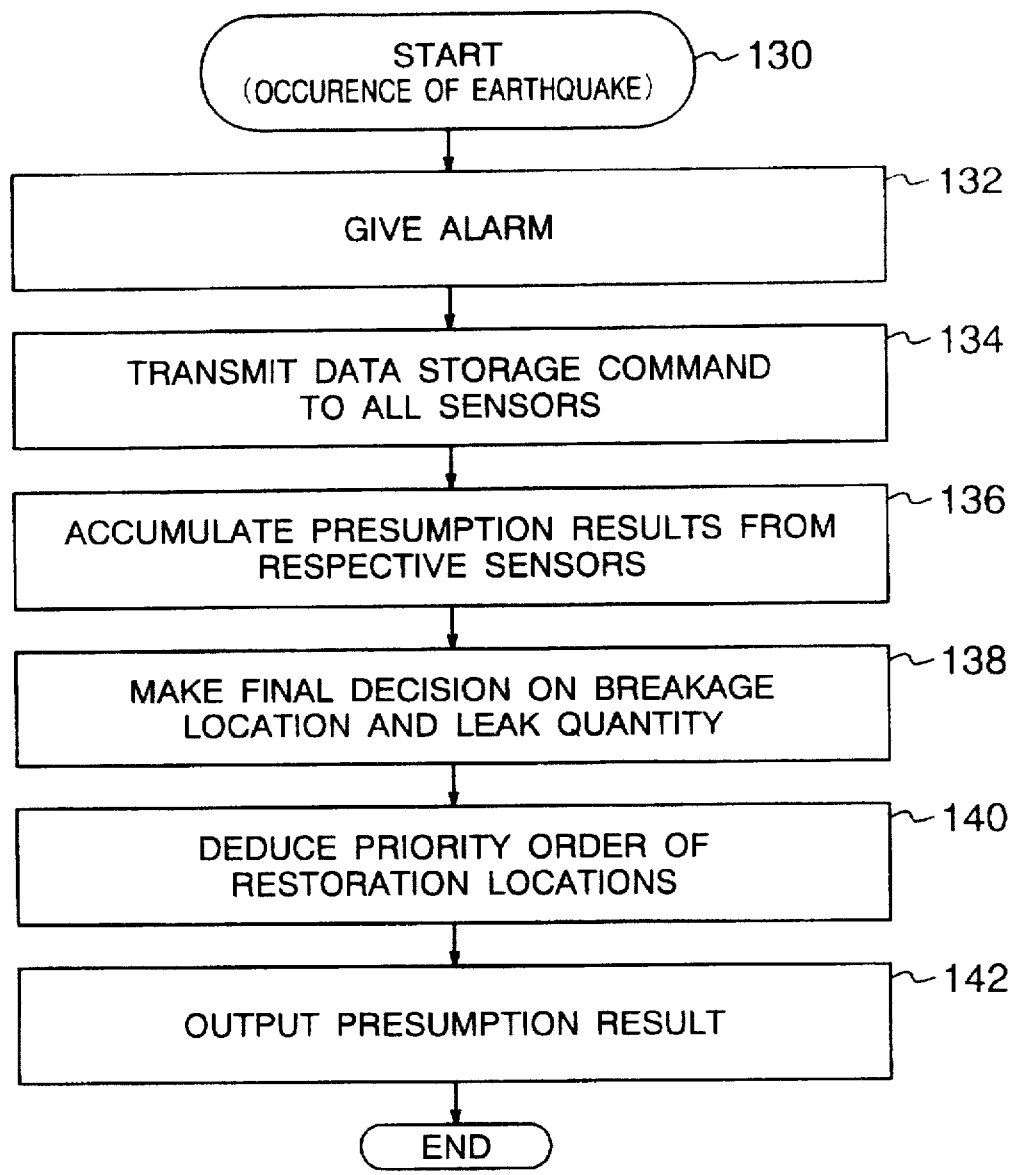
FIG. 10 is a diagram showing the operation flow of the water leak monitoring apparatus at the time of occurrence of an earthquake.

FIG. 10 shows the operation flow of the leak detector 26 at the time of occurrence of an earthquake. If an earthquake occurs (step 130), the seismometer senses this and gives an alarm (step 132) to arouse the monitoring person's attention. At the same time, a data storage command is transmitted to all of the senseors via the communication unit (step 134) to store measured pressure data in the wave memory of each sensor. Results of breakage presumption transmitted from respective sensors are accumulated (step 136). By taking the connection state of the pipe network into consideration, a final decision is made on the breakage (leak) location and leak quantity (step 138). On the basis of at least one of the breakage (leak) location and the leak quantity, locations to be restored are listed in the order of priority (step 140). The result of presumption is outputted (step 142).

In the foregoing description, the managing center has the seismometer 86. Alternatively, each sensor 10 may have a seismometer. And sensing may be started by only a sensor having a seismometer which has felt a seismic intensity of a fixed value or more.

Furthermore, in the above described configuration, a valve may be automatically closed by using presumed information. By using contents stored in the region information DB 24, a valve which does not affect customers is selected and the selected valve is closed. Furthermore, a valve relating to a large number of pipes may be provided with a higher priority order. Furthermore, on the basis of presumed information and contents stored in the region information DB 24, the priority order of restoration works can be determined. Alternatively, disposition locations and the number of workers may be grasped beforehand and a plan of restoration works may be generated on the basis of them and the order of priority.

Heretofore, details of the present invention have been described by taking a water pipe network of water supply as an example. However, the present invention is effective to breakage sensing of a gas tube network as well. In a compressible fluid such as gas, however, the pressure wave is immediately damped and consequently the sensor spacing must be made very short and sensing is difficult. Instead of the pressure wave, therefore, a supersonic wave, i.e., acoustic emission (AE) generated when gas leaks is used. AE sensors are installed instead of pressure sensors, and each of the AE sensors is provided with intelligence. In the case of AE signals as well, there is a proportional relation between the leak quantity and the signal strength. By using exactly the same method, therefore, the leak location and the leak quantity can be presumed. Except that the kind of sensors is changed, the method is essentially identical to the method described above by referring to the example of the water pipe network. Therefore, the present invention is applicable to breakage sensing in a pipeline network of a wide area conveying a fluid.

Since a leak can be sensed concurrently with occurrence thereof, extension of damage can be suppressed to the minimum. Even for a natural disaster such as an earthquake, the damage of a pipeline can be grasped smoothly. Thus the present invention can contribute to implementation of a rapid initial action and smooth restoration work.

We claim:

1. A pipeline breakage sensing method for sensing breakage occurring in a pipeline network formed by pipelines installed so as to form a network, said pipeline breakage sensing method comprising the steps of:

installing, on said pipelines, a leak detector comprising a communication circuit connected to each of a plurality of pressure sensors for supplying pressure wave data sensed by any of the plurality of pressure sensors to a predetermined pressure sensor, said plurality of pressure sensors detecting pressure of a fluid flowing through each pipeline wherein each pressure sensor includes a microprocessor for calculating statistical presumption of any possible breakage;

in response to detection of a pressure change of at least a predetermined value in said fluid by one of said pressure sensors, inputting information relating to a pressure change of another predetermined pressure sensor to the microprocessor of said one of said pressure sensors for the purpose of performing a correlating and comparing step on the pressure change outputs of the two predetermined pressure sensors; and sensing a breakage location of the pipelines by using the inputted information and detected information.

2. A pipeline breakage sensing method according to claim 1, wherein said pipeline network has a plurality of valves for controlling a flow quantity of said fluid, and said pipeline breakage sensing method further comprises the step of adjusting, in response to sensing breakage of a pipeline, the flow quantity of said fluid by using a valve corresponding to a sensed breakage location.

3. A pipeline breakage sensing method according to claim 2, further comprising the steps of:

storing degree of influence of each valve on customers beforehand, and determining a valve for adjusting the flow quantity of said fluid according to stored contents.

4. A pipeline breakage sensing method according to claim 1, further comprising the steps of:

providing value rating and control information for each pipeline in said network beforehand with priority order according to degree of influence of each pipeline on customers; and giving commands of restoration works according to said priority order.

5. A pipeline breakage sensing method according to claim 1, further comprising the steps of:

detecting time of a pressure change according to said inputting information relating to the pressure change; and sensing a breakage location on the basis of the detected time and time of a pressure change detected by other pressure sensors.

6. A pipeline breakage sensing method according to claim 1, wherein said other pressure sensors neighbor said one of said pressure sensors.

7. A pipeline breakage sensing method for sensing breakage occurring in a pipeline network formed by pipelines installed so as to form a network, said pipeline breakage sensing method comprising the steps of:

installing, on said pipelines, a leak detector comprising a communication circuit connected to each of a plurality of pressure sensors for supplying pressure wave data sensed by any of the plurality of pressure sensors to a predetermined pressure sensor, said plurality of pressure sensors detecting pressure of a fluid flowing through each pipeline wherein each pressure sensor includes a microprocessor for calculating statistical presumption of any possible breakage;

in response to detection of a pressure change of at least a predetermined value in said fluid by one of said pressure sensors, inputting information relating to a pressure change of another predetermined pressure sensor to the microprocessor of said one of said pressure sensors for the purpose of performing a correlating and comparing step on the pressure change outputs of the two predetermined pressure sensors;

sensing a breakage location of the pipelines by using the inputted information and detected information; and wherein a dedicated seismometer type of pressure sensor which has felt at least a predetermined seismic intensity is also connected into the plurality of said pressure sensors used to sense a breakage location of a pipeline.

8. A pipeline breakage sensing system having a plurality of pressure sensors installed on pipelines forming a network, pressure of a fluid flowing in said pipelines being measured by said plurality of pressure sensors, said pipeline breakage sensing system comprising:

each of said pressure sensors having a microprocessor that calculates an output signal presuming a breakage location in cooperation with time correlated output signals of other neighboring sensors on the basis of a pressure change of said fluid and transmitting information relating to the presumed breakage location; and a managing center for sensing a breakage location on the basis of information transmitted from respective pressure sensors.

9. A pipeline breakage sensing system according to claim 8, each of said pressure sensors comprising:

a buffer for temporarily holding time series data of measured pressure;

a wave memory, responsive to a change of at least a predetermined value in the pressure of said fluid, for storing, out of time series data stored in said buffer, time series data measured before the change of pressure and time series data measured after the change of pressure; and a processor, responsive to storage into said wave memory, for presuming a breakage location of said pipelines and a leak quantity caused by the breakage on the basis of the time series data stored in said wave memory and time series data stored in wave memories of sensors neighboring said pressure sensor.

10. A pipeline breakage sensing system according to claim 9, wherein when storage into said wave memory is started, one of said pressure sensors including said wave memory transmits information relating to a breakage location presumed by said processor to said managing center.

11. A pipeline breakage sensing system having a plurality of pressure sensors installed on pipelines forming a network, pressure of a fluid flowing in said pipelines being measured by said plurality of pressure sensors, said pipeline breakage sensing system comprising:

each of said pressure sensors having a microprocessor that calculates an output signal presuming a breakage location in cooperation with timed correlated output signals of other neighboring sensors on the basis of a pressure change of said fluid and transmitting information relating to the presumed breakage location;

a managing center for sensing a breakage location on the basis of information transmitted from respective pressure sensors;

each of said pressure sensors comprising:
- a buffer for temporarily holding time series data of measured pressure;
- a wave memory, responsive to a change of at least a predetermined value in the pressure of said fluid, for storing, out of time series data stored in said buffer, time series data measured before the change of pressure and time series data measured after the change of pressure;
- a processor, responsive to storage into said wave memory, for presuming a breakage location of said pipeline and a leak quantity caused by the breakage on the basis of the time series data stored in said wave memory and time series data stored in wave memories of sensors neighboring said pressure sensor; and wherein each of said pressure sensors comprises a seismometer, responsive to feeling of at least a predetermined seismic intensity, for starting storage of said time series data into said wave memory.

12. A pipeline breakage sensing system having a plurality of pressure sensors installed on pipelines forming a network, pressure of a fluid flowing in said pipelines being measured by said plurality of pressure sensors, said pipeline breakage sensing system comprising:

each of said pressure sensors having a microprocessor that calculates an output signal presuming a breakage location in cooperation with timed correlated output signals of other neighboring sensors on the basis of a pressure change of said fluid and transmitting information relating to the presumed breakage location;

a managing center for sensing a breakage location on the basis of information transmitted from respective pressure sensors;

each of said pressure sensors comprising:
- a buffer for temporarily holding time series data of measured pressure;
- a wave memory, responsive to a change of at least a predetermined value in the pressure of said fluid, for storing, out of time series data stored in said buffer, time series data measured before the change of pressure and time series data measured after the change of pressure;

a processor, responsive to storage into said wave memory, for presuming a breakage location of said pipelines and a leak quantity caused by the breakage or the basis of the time series data stored in said wave memory and time series data stored in wave memories of sensors neighboring said pressure sensor; and wherein said managing center comprises:
- a seismometer for sensing occurrence of an earthquake and generating a data holding output signal; and
- a leak information accumulator, responsive to a signal supplied from said seismometer, for accumulating pressure data stored in said wave memory.

13. A pipeline breakage sensing system according to claims 8, wherein said managing center comprises:
- a leak information accumulator for accumulating pressure data stored in said wave memory;
- an alarm generator, responsive to transmission from said pressure sensors, for informing a monitoring person of occurrence of a leak; and a parameter manager for adjusting parameters to be used by said pressure sensors for presumption.

14. A pipeline breakage sensing system according to claim 8, further comprising an alarm generator for informing a monitoring person of occurrence of a leak according to contents of time series data stored in said wave memory.

15. A pipeline breakage sensing system according to claim 8, wherein said pressure sensors are disposed on branch points of said pipeline network.

16. A pipeline breakage sensing system according to claim 8, wherein said pipeline network comprises valves for adjusting flow quantity, and said managing center adjusts opening of said valves according to predetermined priority orders and customer demands of affected pipelines disposed near a sensed breakage location.

17. A pipeline breakage sensing system for sensing breakage of a pipeline in a gas conveying pipeline network, comprising:

a plurality of acoustic wave emission sensors installed in pipelines of said pipeline network to sense supersonic waves generated within said conveyed gas upon occurrence of a leak of gas at a break in said pipeline; and upon sensing said supersonic waves, each of said acoustic wave emission sensors presuming a breakage location in cooperation with the time correlated output results obtained by one or more other neighboring acoustic wave emission sensors among said plurality of acoustic waves emission sensors.

18. A pipeline breakage sensing method according to claim 1, wherein said sensing a breakage location of the pipelines by using the inputted information and detected information occurs in a case where a plurality of said pipelines are extended from said one of said pressure sensors, only said one of said pressure sensors deriving coincident presumption results from communication with all neighboring sensors.

19. A pipeline breakage sensing method according to claim 18, wherein a dedicated seismometer type of pressure sensor which has felt at least a predetermined seismic intensity is also connected into the plurality of said pressure sensors used to sense a breakage location of a pipeline.

20. A pipeline breakage sensing system having a plurality of pressure sensors installed on pipelines forming a network, pressure of a fluid flowing in said pipelines being measured by said plurality of pressure sensors, said pipeline breakage sensing system comprising:

each of said pressure sensors having a microprocessor that calculates an output signal presuming a breakage location in cooperation with time correlated output signals of other neighboring sensors in a case where a plurality of said pipelines are extended from said one of pressure sensors, on the basis of a pressure change of said fluid and transmitting information relating to the presumed breakage location, only said one of said pressure sensors deriving coincident presumption results from communication with all neighboring sensors; and a managing center for sensing a breakage location on the basis of information transmitted from respective pressure sensors of said plurality of pressure sensors.

21. A pipeline breakage sensing system according to claim 20, wherein each of said pressure sensors comprises a seismometer, responsive to feeling of at least a predetermined seismic intensity, for starting storage of said time series data into said wave memory.

22. A pipeline breakage sensing system according to claim 20, wherein said managing center include:
   a wave memory for storing a time series data of measured pressure, and
   a wave memory for storing a time series data of measured pressure; and,
   a seismometer for sensing occurrence of an earthquake and generating a data holding output signal; and
   a leak information accumulator, responsive to a signal supplied from said seismometer, for accumulating pressure data stored in said wave memory.

23. A pipeline breakage sensing system for sensing breakage of a pipeline in a gas conveying pipeline network, comprising:
   a plurality of acoustic wave emission sensors installed in pipelines of said pipeline network to sense supersonic waves generated upon a leak of gas; and
   upon sensing said supersonic waves, each of said acoustic wave emission sensors presuming a breakage location in cooperation with the time correlated output results obtained by one or more other neighboring acoustic wave emission sensors among said plurality of acoustic wave emission sensors where a plurality of pipelines are extended from said each of said acoustic wave emission sensors, only said each of said acoustic wave emission sensors deriving coincident presumption results from communication with all neighboring acoustic wave emission sensors.

* * * * *